United States Patent [19]
Winslow et al.

[11] 3,940,162
[45] Feb. 24, 1976

[54] STRUCTURAL MEMBER

[75] Inventors: Gerald R. Winslow, Royal Oak; Jack J. Ritchie, Washington Township, both of Mich.

[73] Assignee: United States Steel Corporation, Pittsburgh, Pa.

[22] Filed: Dec. 13, 1974

[21] Appl. No.: 532,403

[52] U.S. Cl. ............................... 280/106 R; 52/694
[51] Int. Cl.² ......................................... B62D 21/00
[58] Field of Search .................... 280/106 R; 52/694

[56] References Cited
UNITED STATES PATENTS

| | | | |
|---|---|---|---|
| 2,065,005 | 12/1936 | Zabriskie | 280/106 R |
| 2,422,912 | 6/1947 | Kling | 280/106 R X |
| 3,106,995 | 10/1963 | Abramson | 52/694 |
| 3,110,933 | 11/1963 | Cadmus | 52/694 X |

*Primary Examiner*—Philip Goodman
*Attorney, Agent, or Firm*—McGlynn and Milton

[57] ABSTRACT

A load-bearing structural member comprising an upper plate member, a lower plate member spaced a distance X from the upper plate member, and a reinforcing web comprising a plurality of web segments extending back and forth between the web segments in zigzag fashion, the web segments meeting the plate members at a web angle $\theta$, wherein the magnitude of the two variables X and $\theta$ are varied over the length of the structural member in accordance with the weight, strength, and shape requirements of particular sections thereof.

13 Claims, 5 Drawing Figures

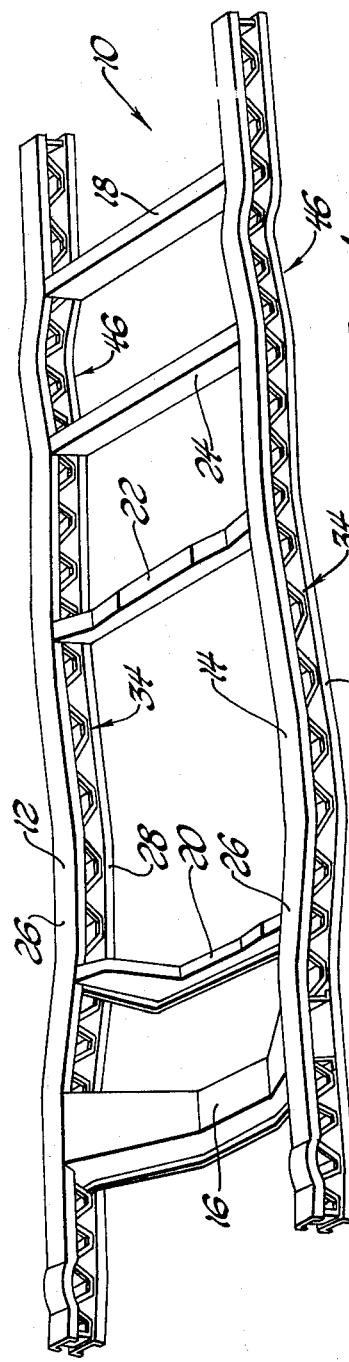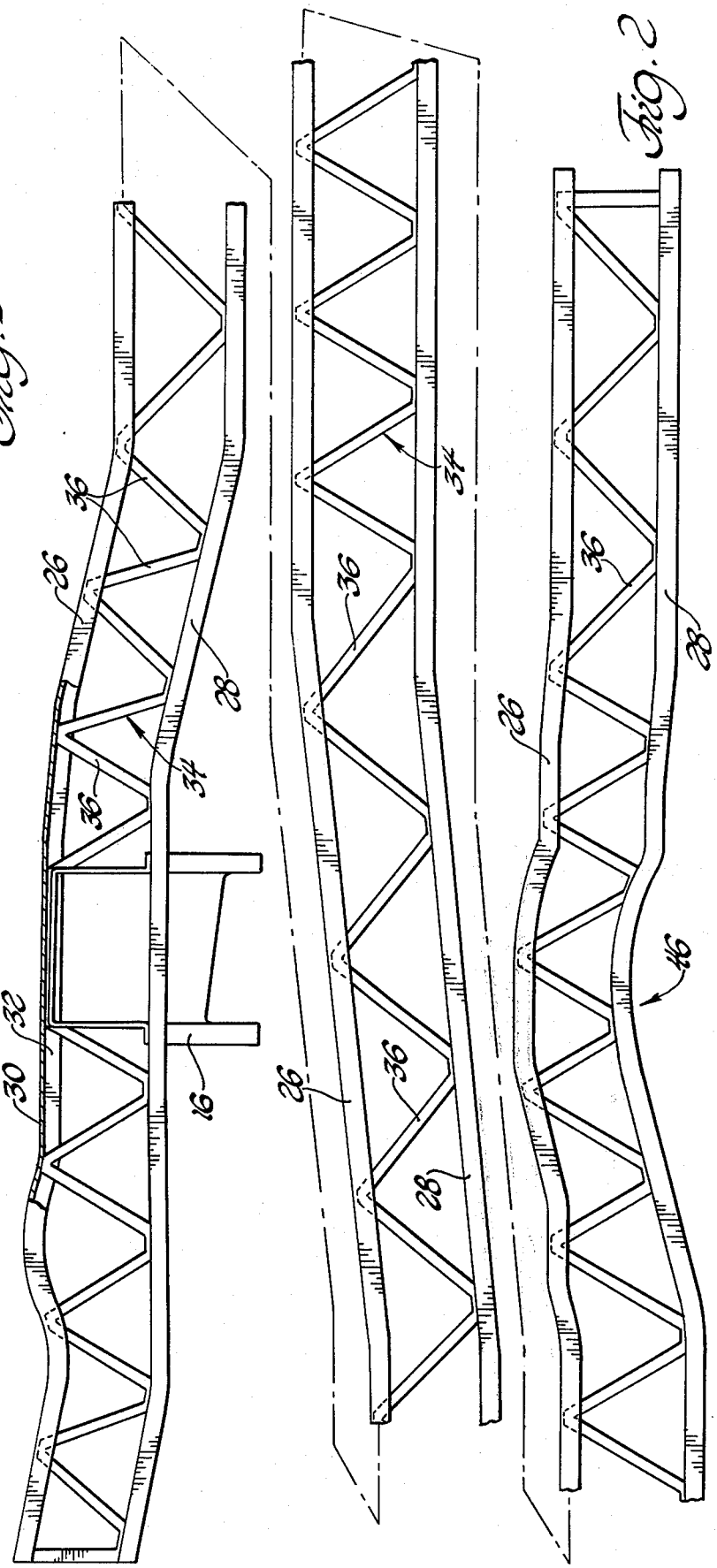

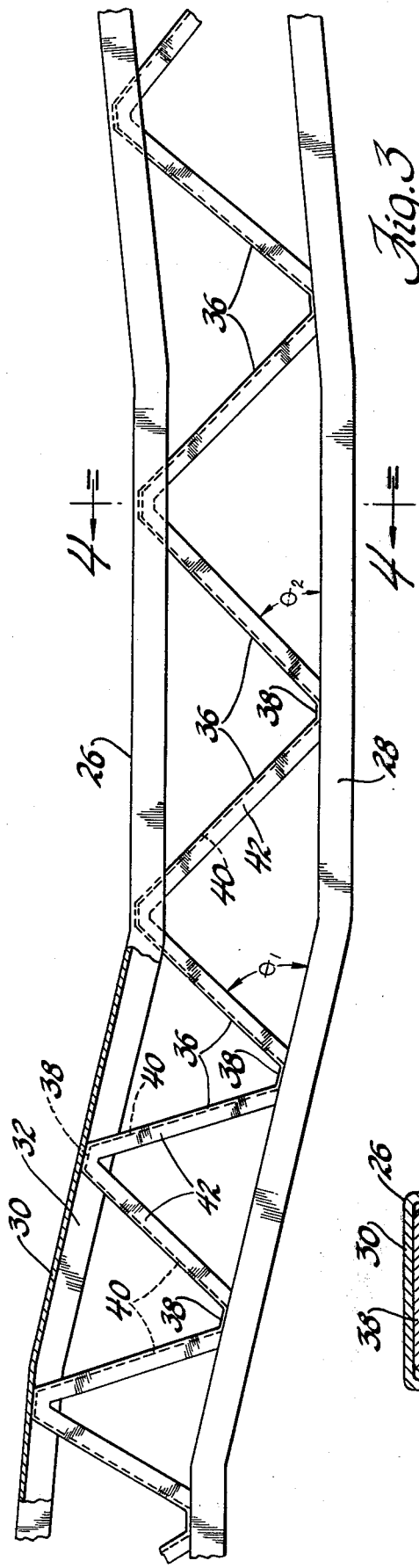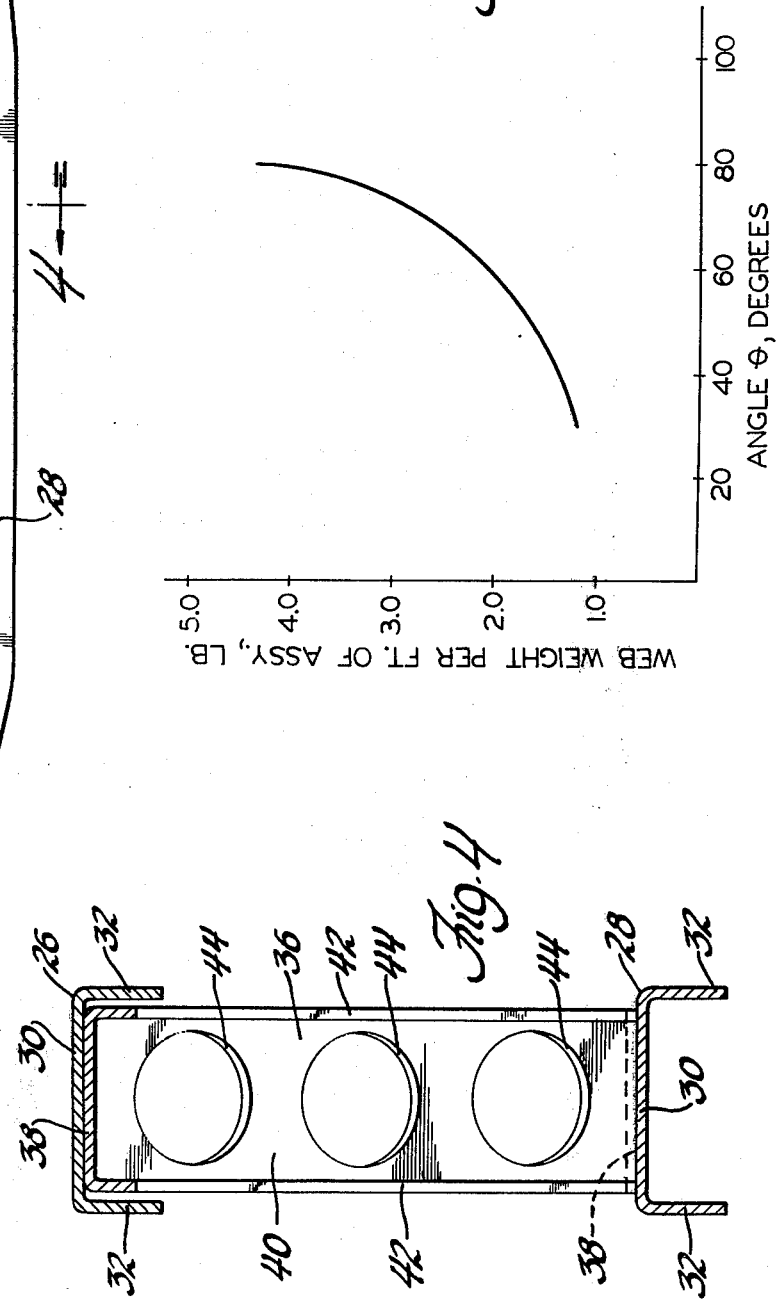

//STRUCTURAL MEMBER

This invention relates to a load-bearing structural member which is adapted for use in an environment in which the load requirements of the structural member vary over the length of the member. In other words, certain regions of the structural member are called upon to support greater loads than other regions. A structural member of the type referred to is particularly suited for use in vehicle frame assemblies. However, it is not intended that the application of the invention be limited solely to vehicle frame assemblies. Due to the special adaptability of the invention to vehicle frame assemblies, such an assembly is employed to exemplify the structure and function of the invention.

Heretofore, vehicle frame assemblies have typically included a pair of parallel, spaced-apart C-channel members of constant gauge or thickness which are joined together by a plurality of cross members. The C-channel members in a vehicle frame assembly as herein referred to include a vertical web portion and upper and lower laterally extending flanges. Due to manufacturing considerations, the gauge or thickness of the C-channel members remains substantially constant over their length. Accordingly, the weight per unit length and strength of the C-channel members also remain substantially constant. This is the case even though certain sections of the C-channel members need carry a far smaller load than other sections.

The size of the C-channels for a particular frame assembly is selected on the basis of the maximum load which must be carried by any one section. In other words, the frame is designed in view of the strength required by the heaviest loaded section of the C-channel member. Consequently, the strength of the C-channel member over much of its length is stronger than required due to the varying load distribution. As a general rule, weight increases in proportion to strength for any given material. Therefore, since certain sections of the frame are stronger than required by the loads experienced there is an unnecessary allocation of material to such sections. This additional material is wasted and adds unneeded weight to the frame assembly.

By way of illustration, in a typical light truck frame assembly the greatest load on the C-channel members is experienced in the vicinity of the engine mounts. Each side of the C-channel member in the regions where the engine mounts are located must be capable of carrying a load of over two thousand pounds. This figure is based on standard manufacturing requirements which include a safety factor. On the other hand, the regions a slight distance in front of the engine mounts in which the forward cab body mounts are located need only be capable of carrying a load of approximately 700 pounds including a safety factor. Since, as a general rule, the size of the C-channel members do not vary over their length, the regions in which the forward cab body mounts are located are as strong as, and, therefore, as heavy as, the regions in which the engine mounts are located although the former need carry only one third the load. It is apparent, therefore, that weight and material are wasted in the regions in which the forward cab body mounts are located.

Moreover, in many structural members, and particularly in vehicle frame assemblies, it is necessary to provide curved or bent sections commonly referred to as "kick-ups". As used herein a kick-up refers to a section of an otherwise straight C-channel member in which the vertical height is gradually increased and then decreased to produce a "hump". In a vehicle frame assembly, kick-ups are generally employed to accomodate the front and rear axle housings. The kick-up sections are troublesome since these discontinuities may interfere with the body or other components of the vehicle assembly. More specifically, in a standard vehicle frame using C-channel members, the height of the channel member remains constant through the kick-up section by maintaining the width of the web portion. This is required because the kick-up sections are generally relatively high-load regions since they support the axle housings.

The increased height of the C-channel in the kick-up section oftentimes causes packaging problems because they interfere with the wheel wells, suspension system and other components which must be located near the axle housings. Since a reduction of the width of the web portion is accompanied by a reduction in weight and therefore load carrying strength, it would be inappropriate to merely reduce the height of the member by reducing the width of the web. Moreover, in view of the normal methods employed in manufacturing C-channels, it would be difficult, as a practical matter, to provide such a reduction. In short, with standard C-channels, it is impossible to specially tailor the height and strength of the member in view of varying load requirements. This results in unnecessary weight, wasted material, and packaging problems.

In view of the foregoing, it is an object of the instant invention to provide a load-bearing structural member which is adapted to carry varying loads over its length wherein the height and strength of the structural member may be varied. The structural member of the instant invention includes an upper plate member, a lower plate member spaced apart a distance X from the upper plate member, and a reinforcing web comprising a plurality of web segments extending back and forth between the plate members in zigzag fashion. The web segments meet the plate members at a web angle $\theta$. The weight, strength and shape of the structural member may be varied over its length by changing either of the variables X or $\theta$ in accordance with load and shape requirements. Moreover, the web segments may be provided with weight reducing cut-outs in relatively low-load regions to further reduce the weight of the structural member in relatively low-load regions.

Other advantages of the present invention will be readily appreciated as the same becomes better understood by reference to the following detailed description when considered in connection with the accompanying drawings wherein:

FIG. 1 is a perspective view of a vehicle frame assembly constructed in accordance with the instant invention;

FIG. 2 is a side-elevational view of the vehicle frame assembly;

FIG. 3 is an enlarged, broken-away side-elevational view similar to FIG. 2;

FIG. 4 is a transverse cross-sectional view taken generally along line 4—4 of FIG. 3; and FIG. 5 is a graph illustrating the relationship between web weight and the web angle $\theta$.

Referring to the drawings, a vehicle frame assembly incorporating a pair of structural members constructed in accordance with the instant invention is generally shown at 10.

The vehicle frame assembly 10 is typical of one which is adapted for use in a light truck, such as, a pick-up truck. The instant invention, however, has equal application with automobile frames as well as other types of frames and structures.

Generally, the vehicle frame assembly 10 includes first and second parallel and spaced-apart structural members 12 and 14 which are connected by a plurality of cross members. The cross members are adapted to support the various components of the vehicle construction. More specifically, the front and rear cross members 16 and 18 are adapted to support the front and rear axle housings of the vehicle. One of the intermediate cross members 20 is adapted to support the transmission housing while the remaining cross members 22 and 24 support the bed of the pick-up truck. The cross members generally define relatively high-load regions on the structural members 12 and 14 at the points of connection. It is noted, however, that the loads vary. That is, the regions near the front cross member 16 experience much greater loads than the regions which carry the truck bed.

Each of the structural members 12 and 14 include an upper plate member 26 and a lower plate member 28 in vertical spaced relationship. Each of plate members 26 and 28 is generally C-shaped as shown in FIG. 4 and includes an intermediate wall 30 and perpendicularly extending edges 32. As shown, the two plate members 12 and 14 face downwardly.

A reinforcing web generally indicated at 34 connects the upper and lower plates 26 and 28. The reinforcing web 34 includes a plurality of web segments 36 extending back and forth between the plate members 26 and 28 in zigzag fashion. Preferably, the reinforcing web comprises a continuous strip of metal. The strip of metal is bent to form the individual web segments 36 and, at the juncture of adjacent web segments 36, flat portions 38 are provided. The flat portions 38 are welded or otherwise connected to the plate members 26 and 28. In order to increase the strength of the web, each of the web segments are preferably channel shaped, that is, each includes an intermediate strip 40 and perpendicularly extending sides 42.

Each of the wall segments 36 meet the plate members 26 and 28 at a web angle $\theta$ as shown in FIG. 3. The web angle $\theta$ is the acute angle between the web segment 36 and the plate member 26 or 28 to which it is joined.

The weight per unit length and, therefore, the strength of the structural members 12 and 14 can be varied by changing the web angle $\theta$. The relationship between the angle $\theta$ and the total weight of the structural members when the plates are 0.134 inches thick and the reinforcing web is 0.105 inches thick is shown in the following table:

| Web Angle $\theta$ | Wt./Ft. of Web | Wt./Ft. of two Plates | Total Wt./Ft. of Assy. (Web Plates) |
|---|---|---|---|
| 30° | 1.26 lb. | 3.98 lb. | 5.24 lb. |
| 40° | 1.40 lb. | 3.98 lb. | 5.38 lb. |
| 50° | 1.66 lb. | 3.98 lb. | 5.64 lb. |
| 60° | 2.04 lb. | 3.98 lb. | 6.02 lb. |
| 70° | 2.75 lb. | 3.98 lb. | 6.73 lb. |
| 80° | 4.42 lb. | 3.98 lb. | 8.40 lb. |

The relationship between the web angle $\theta$ and the weight per foot of the reinforcing web is graphically shown in FIG. 5. It is noted that as the web angle $\theta$ increases the weight of the web per foot of the assembly also increases. Accordingly, the total weight of the structural member increases. The increase in weight reflects an increase in the amount of material per unit length. As stated above, an increase in the amount of material increases strength. Therefore, increasing the web angle $\theta$ is accompanied by an increase in strength. It is therefore possible to vary the strength of the structural members 12 and 14 over their length in accordance with a varying load distribution by changing the web angle $\theta$. In other words, the web angle $\theta$ may be increased in the relatively high-load regions thereby increasing the weight and consequently the strength of the structural member. In relatively low-load regions, in which the strength requirements are reduced, the web angle $\theta$ may be reduced thereby decreasing the weight of the structural member.

An example of the foregoing is shown particularly in FIG. 3. The left end of the structural member must carry a relatively high-load since it is near the front axle cross member 16 while the right end of the structural member is a relatively low-load region. In the relatively high-load region, near the left end of the structural member, the web angle $\theta_1$ is greater than the web angle $\theta_2$ in the relatively low-load region. In the structural members shown in FIG. 3 $\theta_1$ equals approximately 60° and $\theta_2$ equals approximately 45°. By reference to FIG. 5 and the Table it is apparent that the weight of the relatively low-load region is reduced by using a web angle of 45°.

Since the resulting change in weight accompanying a decrease in the web angle $\theta$ falls off rapidly below 40°, reduction of weight by further decreasing the angle below 40° becomes less productive. This is shown in FIG. 5. As the web angle $\theta$ is reduced below 40° the slope of the curve quickly approaches zero. Therefore, a smaller weight reduction is achieved for each incremental change in the web angle $\theta$. As an alternative, therefore, weight reducing cut-outs 44, such as are shown in FIG. 4, may be employed to further reduce the weight of the reinforcing web 34. The size, shape, and location, of the weight reducing cut-outs 44 are determined by employing standard stress analysis techniques. That is, the cut-outs 44 are located in those areas of the web 34 having the lowest stress to prevent web failure.

The upper and lower plate members are spaced apart a distance X. Generally, the distance X remains constant over the length of the structural members 12 and 14. However, kick-ups, generally shown at 46, are required in certain locations. For example, kick-ups are required where the frame 10 passes over the rear axle housing. It has been found by the inventor that the distance between the upper and lower plate members 26 and 28 may be reduced to more easily accomodate the vehicle body and other vehicle components while maintaining the weight and strength of the structural member by keeping the web angle $\theta$ constant. In other words, as shown in FIG. 2, the web angle $\theta$ is approximately 60° through the kick-up portion 46 while the distance X between the upper and lower plate members 26 and 28 is reduced. It is, therefore, possible to vary the height of the structural members 12 and 14 without sacrificing strength. In other words, reducing the amplitude of the reinforcing web 34 increases the frequency thereof so that the amount of web material per unit length of structural member remains constant regardless of the distance between the plate members 26 and 28.

For example, in a vehicle frame assembly as shown it may be desirable to reduce the height of the structural member from the standard 6.75 inches to 4.00 inches in the region of the rear axle. By maintaining the web angle $\theta$ constant over the reduced region, the structural member will not be weakened. Accordingly, when encountering areas of limited dimension, the height of the structural member can be reduced without loss of bending strength.

By employing a structural member constructed in accordance with the instant invention and by judicious attention to the spacing distance X of the plate members and the web angle $\theta$ a structural member having optimum strength and weight can be fabricated. For example, by employing the teachings of the instant invention, a vehicle truck frame for a light truck may be manufactured with a substantial weight reduction and consequent material savings without sacrificing strength.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that within the scope of the appended claims, the invention may be practiced otherwise than as specifically described.

We claim:

1. A vehicle frame assembly comprising: first and second parallel and spaced-apart structural members and a plurality of cross members connecting said structural members; each of said structural members including an upper plate member, a lower plate member, said upper and lower plate members being spaced apart a distance equal to variable X, and a reinforcing web comprising a plurality of web segments extending back and forth between said plate members in zigzag fashion, said web segments meeting said plate members at a web angle equal to variable $\theta$; said structural member including a region having a higher load requirement wherein the distance between the points of intersection of adjacent web segments with said plate members is shorter for both of said upper and lower plate members than in regions having lesser load requirements, the distance between said points of intersection being reduced by varying at least one of said variables.

2. An assembly as set forth in claim 1 wherein said web angle $\theta$ is greater in relatively high-load regions and lower in relatively low-load regions.

3. An assembly as set forth in claim 2 wherein said web segments include weight reducing cut-outs in relatively low-load regions.

4. An assembly as set forth in claim 2 wherein said structural member includes a first region and a second region, said upper and lower plate members being spaced apart a greater distance X in said first region than said second region and said web segments having the same web angle $\theta$ in both of said regions whereby the weight per unit length and strength of said regions are substantially equal.

5. An assembly as set forth in claim 1 wherein said structural member includes a first region and a second region said upper and lower plate members being spaced apart a greater distance X than said first region than said second region and said web segments having the same web angle $\theta$ in both of said regions whereby the weight per unit length and strength of said regions are substantially equal.

6. A vehicle frame assembly comprising: first and second parallel and spaced-apart structural members and a plurality of cross members connecting said structural members; each of said structural members including an upper plate member, a lower plate member substantially parallel to and spaced from said upper plate member, and a reinforcing web comprising a plurality of web segments extending back and forth between said plate members in zigzag fashion, said web segments meeting said plate members at a web angle; said structural member including regions having different load requirements wherein a lower load region includes a plurality of web segments meeting said upper and lower plate members at a first angle and a higher load region including at least two adjacent web segments meeting said upper and lower plate members at a second angle which is greater than said first angle whereby the bending strength of said higher load region is increased.

7. A structural member as set forth in claim 6 wherein said web segments include weight reducing cut-outs in said low-load regions.

8. A load-bearing structural member comprising: an upper plate member, a lower plate member, said upper and lower plate members being spaced apart a distance equal to variable X, and a reinforcing web comprising a plurality of web segments extending back and forth between said plate members in zigzag fashion, said web segments meeting said plate members at a web angle equal to variable $\theta$; said structural member including a region having a higher load requirement wherein the distance between the points of intersection of adjacent web segments with said plate members is shorter for both of said upper and lower plate members and in regions having lesser load requirements, the distance between said points of intersection being reduced by varying at least one of said variables.

9. A structural member as set forth in claim 8 wherein some of said web segments include weight reducing cut-outs.

10. A structural member as set forth in claim 8 wherein said structural member includes a first region and a second region, said upper and lower plate members being spaced apart a greater distance X in said first region than said second region and said web segments having the same web angle $\theta$ in both of said regions whereby the weight per unit length and strength of said regions are substantially equal.

11. An assembly as set forth in claim 8 wherein said structural member includes relatively high-load regions and relatively low-load regions, said web angle $\theta$ being greater in said high-load regions and lower in said low-load regions.

12. A load-bearing structural member comprising: an upper plate member, a lower plate member substantially parallel to and spaced from said upper plate member, and a reinforcing web comprising a plurality of web segments extending back and forth between said plate members in zigzag fashion, said web segments meeting said plate members at a web angle; said structural member including regions having different load requirements wherein a lower load region includes a plurality of web segments meeting said upper and lower plate members at a first angle and a higher load region including at least two adjacent web segments meeting said upper and lower plate members at a second angle which is greater than said first angle whereby the bending strength of said higher load region is increased.

13. A structural member as set forth in claim 12 wherein said web segments include weight reducing cut-outs in said low-load regions.

* * * * *